March 31, 1931. G. L. ROTHROCK 1,798,954
INTERNAL BRAKE
Filed Feb. 6, 1928 2 Sheets-Sheet 1
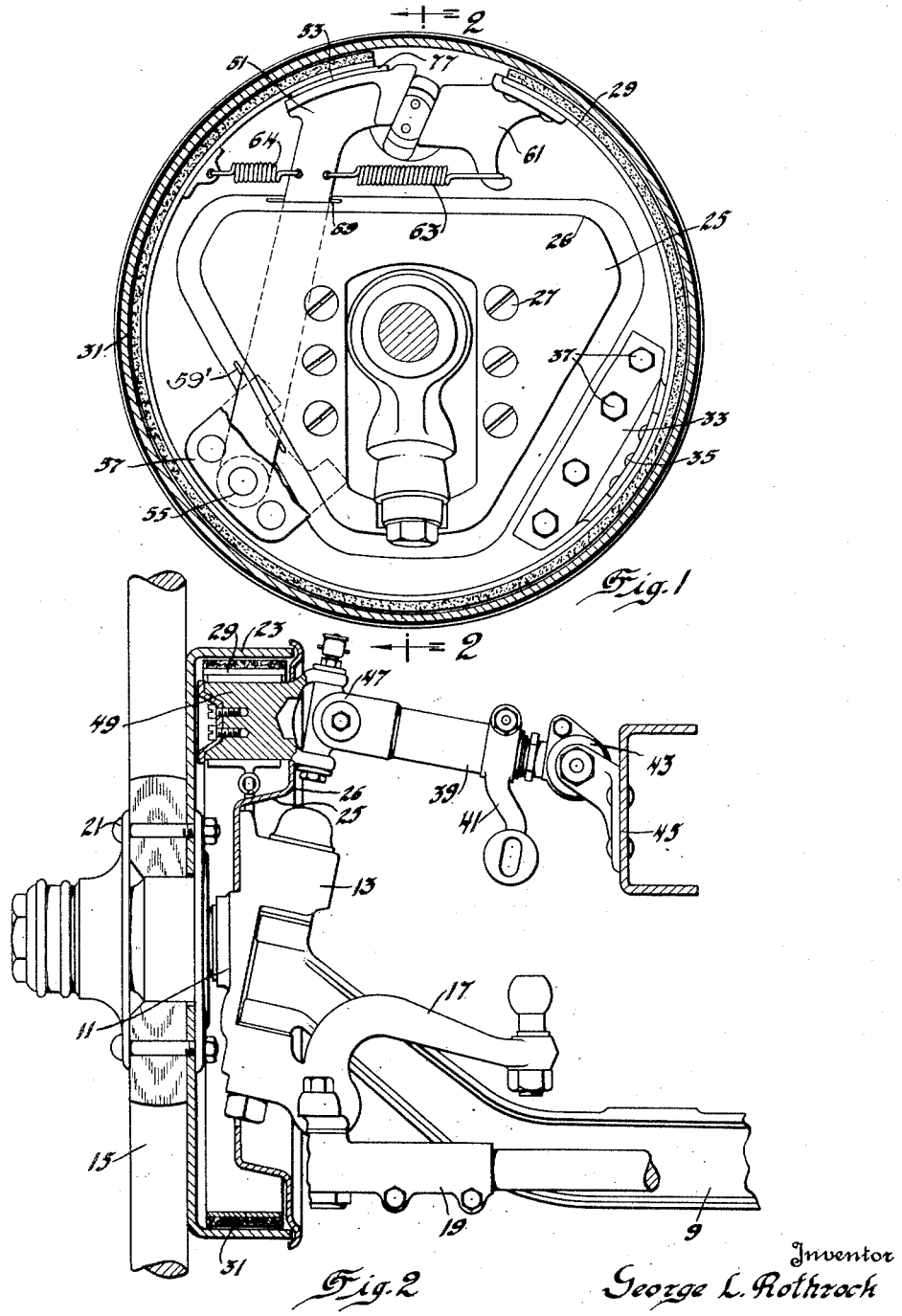
Inventor
George L. Rothrock
By Blackmore, Spencer & Fish
Attorneys

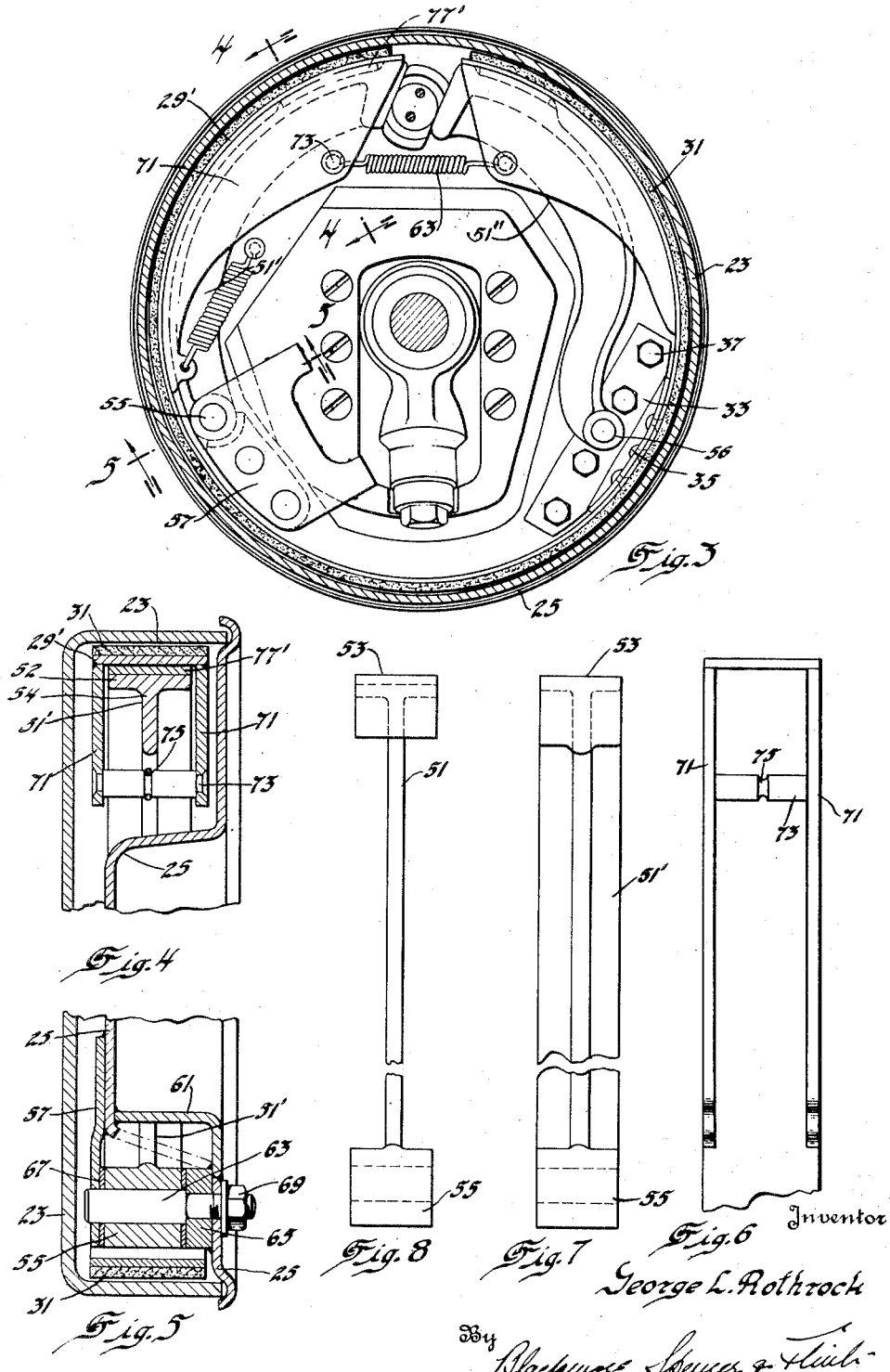

Patented Mar. 31, 1931

1,798,954

UNITED STATES PATENT OFFICE

GEORGE L. ROTHROCK, OF DETROIT, MICHIGAN, ASSIGNOR TO GENERAL MOTORS CORPORATION, OF DETROIT, MICHIGAN, A CORPORATION OF DELAWARE

INTERNAL BRAKE

Application filed February 6, 1928. Serial No. 252,270.

This invention relates to brakes and has been designed as an improvement in brake mechanism for use in vehicles.

It is an object of the invention to reduce the movement of the actuating cam and of the pedal or lever used to rotate the cam. Another object is to render the pedal movement independent of the condition of the brake lining, and of the variable dimensions of the drum as a result of temperature changes or other causes. As another object the invention aims to attain a more uniform action throughout the extent of the frictionally engaging surfaces. The invention avoids the necessity of frequent relining.

Other objects and advantages will be understood from a reading of the following description and an examination of the accompanying drawing.

In the drawing:

Figure 1 is a view of the brake within the drum in side elevation.

Figure 2 is a section substantially on line 2—2 of Figure 1.

Figure 3 is a view corresponding to Figure 1 but of a modified form.

Figure 4 is a section on line 4—4 of Figure 3.

Figure 5 is a section on line 5—5 of Figure 3.

Figure 6 is a view in elevation of the reenforced band used in the construction illustrated in Figure 3.

Figure 7 is a view in elevation of the shoe used in the construction shown in Figure 3.

Figure 8 is a view of the shoe used in the form shown by Figure 1.

Referring by reference characters to the drawing and first to Figures 1, 2 and 8, numeral 9 represents a conventional front axle having a steering knuckle 11 swiveled thereto by means of forks 13 above and below the end of the axle 9. The steering knuckle is formed with a stub axle rotatably supporting a wheel 15 in the usual way. To the steering knuckle are secured the usual steering arm 17 and the connecting link 19. Bolts 21 are used to rigidly fasten the brake drum 23 to the wheel. A backing plate 25 closes the drum and is bent outwardly toward the wheel in the region between its outer and inner portions, as shown by numeral 26. Inwardly from the bent portion 26 the backing plate engages and is secured to the steering knuckle by fastening means 27 shown in Figure 1. A metallic brake band 29, of any preferred material, is provided with a lining 31 to frictionally engage the inner surface of the drum and check the rotation of the wheel. The band is anchored in any known way, as by a plate 33 secured to the band by fastening means 35 and to the backing plate 25 by fastening means 37. Preferably this anchor is so located as to divide the band into unequal parts such that the longer part is self energizing for forward vehicle travel, the drum in Figure 1 being intended to be rotated in a counter-clockwise direction for forward vehicle travel.

It is intended that the brake shall be actuated in a well-known manner. The drawing illustrates a convenient brake applying means including a rock shaft 39 operated from the pedal or lever by suitable linkage connected to an arm 41 extended from the rock shaft 39. As is usual in such an operating means there is a ball joint or its equivalent adjacent the frame 45 and illustrated in a general way by numeral 43. A universal joint is conventionally illustrated by the part designated by numeral 47. This universal joint is located substantially over the swivelling axis of the steering knuckle. The rock shaft rotates a cam 49 which is positioned within the enclosure defined by drum 23 and backing plate 25.

In the usual arrangement the cam engages the abutments on the adjacent ends of the band to expand the band portions into frictional contact with the inner surface of the drum. Under such circumstances the wrapping action of the leading band part serves as a force additional to the pedal applied force to cause frictional retardation. Such wrapping action tends to move the end of the leading band portion away from the cam. At the same time the opposite influence exerted by the drum upon the other band portion is such as to prevent the easy rotation of the cam to follow up the movement due to the movement of the band in taking up clearance. As a result the pedal pressure is relatively high if the cam continues to be turned sufficiently to engage and press upon the leading band part. Various arrangements, such as floating cams, have been adopted to avoid this mentioned difficulty and to make it possible to divide substantially equally the pedal pressure between the two parts of the band. With the novel brake applying means herein described the necessity to make use of any of these more or less unsatisfactory expedients is avoided. There is provided in addition to the band a rigid intermediate member which may be called a shoe and is designated by numeral 51. This member 51 has an arc shaped surface 53 which carries a metal lining member 77 engaging the inner circumferential face of the band near the cam. The shoe 51 is extended beyond the end of the band and has an engaging surface angularly related to the surface 53 for engagement with the cam. This intermediate member or shoe 51 is elongated and pivoted as at 55 between the backing plate 25 and a plate 57 secured to the backing plate as illustrated. If desired, a plurality of points of pivotal connection may be provided by registering openings in the backing plate and in plate 57, as suggested by the showing of Figure 1. An examination of Figure 2 will show that the backing plate is bent outwardly as at 26 to engage the outer face of the steering knuckle. With the shoe 51 as illustrated in Figure 1 it will be seen that pivot end and the band engaging end are within the enclosure defined by the drum and backing plate but that the middle portion of the shoe is necessarily located inwardly of the backing plate and not within the drum enclosure. To accommodate the shoe 51 the backing plate has been slotted as at 59' in the intermediate bent region for the passage of the shoe 51. On the side of the cam remote from the shoe 51 instead of a similar shoe 51 to engage the shorter portion of the band 29 the cam is shown as engaging the band directly instead of through the instrumentality of the shoe. To that end the band end is equipped with an abutment member 61 which is shaped to engage the cam directly.

For the purpose of releasing the brake after being applied a coil spring 63 is used. This spring may be otherwise connected to the elements of the brake but I have shown it connected to a hooked part of abutment 61 and the other end of the spring 63 is engaged in an opening in the shoe 51. This spring 63 serves to pull both the short end of the band and the shoe 51 against the cam. To further ensure the release of the long part of the band there may be used a spring 64 positioned between and connected to the band end and the shoe 51. This spring 64 is relatively light so as not to resist the action of spring 63, its function being to pull away from the drum the longer part of the band which might tend to cling to the drum under the influence of self energization.

The metal lining 77 on the surface 53 of the shoe engaging the band affords a metal to metal contact and has a frictional coefficient much less than that between the lining and drum. To reduce the friction at 77 lubricating may be resorted to if desired. It will be seen that with the wrapping effect of the band there occurs a slipping between the band and the shoe so that the brake band clearance is taken up without any corresponding movement of the cam, the cam merely causing the engagement of the band and drum at the cam end of the band.

By the mechanism described it is possible to take up band clearance and secure the self energizing effect without corresponding cam movement, and, of course, without further pedal movement. This arrangement avoids the necessity of resorting to a floating cam mounting and of providing some sort of centralizing means to ensure the correct position of the brake mechanism as a whole upon release. The band may be set at almost any clearance since this clearance is taken up by the slipping at 77 between the shoe and the band and not by a corresponding movement of the cam and pedal. The well-known difficulties arising from drum eccentricity and from dragging brakes are therefore easily eliminated without unduly increasing pedal movement.

The brakes should never require adjustment during the life of the lining since the movement of parts is such that a clearance greater than the thickness of the lining may readily be taken up.

Heated drums in the case of usual practice mean an increase in pedal travel, but in this brake the sliding movement between the shoe and the band takes care of the added clearance due to the expansion or distortion of the drum under the influence of heat and no added pedal movement occurs. Furthermore, the brake application is more powerful and uniform than with conventional brakes.

It is a matter of common observation in the case of wrapping bands that the band wears most rapidly near the anchor, the extent of wear decreasing around the drum from the anchor toward the cam, the wear at the cam being the least. In fact, this portion of the band gives little if any service in braking. This is because the band is forced around by the wrapping action of the drum, drum pressure increasing from almost zero at the cam to a maximum at a point nearest the anchor. Since in this case the shoe positively forces that part of the band near the cam more directly against the drum more uniform pressures will occur resulting in more uniform wear, longer lining life, and more powerful brake application.

It should be noted also that the ratio of the coefficient of friction between the band and the shoe on the one hand and between the lining and the drum on the other determines the amount of self energization of this brake. By properly selecting the lining material at 77 the self energizing factor is therefore under control of the brake maker. Also the distance from the point of shoe application to its pivot point is another determining factor. For the purpose of varying this factor the provision for a plurality of pivot points 55 is made whereby shoes of varying length may be used. Opportunity is therefore offered for any specific needs in the nature of self-energization.

A more recently developed form of the invention is shown in Figures 3 to 7 inclusive. In this form of the invention drum 23 and backing plate 25 house the brake mechanism as in Figures 1 to 2. The brake band 29' is similar to band 29. To show the use of two shoes instead of one the abutment 61 of the first form is omitted. The band anchor at 33 with fastening means 35 and 37 is substantially the same. Band lining 31 is the same. At 55 and 57 is the pivotal connection for the shoe which pivot is adjustable as already described. In this form of the invention there is shown a second shoe pivoted at 56. This pivot may be conveniently made on the anchor plate for the band as illustrated. It will be understood of course that but one shoe may be used in this second form if preferred.

In the second form of the invention the shoes are of modified construction. These shoes 51" are of arcuate shape as shown in Figure 3 and of T section as shown in Figure 4, each having a flange 52 and web 54. It is to the end of these shoes near the cam that the metal friction plates 77' are secured. By making the shoe of arcuate shape as described it may be wholly disposed within the drum enclosure and not project through slots in the backing plate as in the form just described. The function and the operation of the shoe 51' relative to the band and cam is the same as before. By shaping the shoe as it is and avoiding the passage through plate 25 it is possible to make it stiffer by the use of T shaped material. When two shoes are used the two shoes are oppositely curved but otherwise substantially alike. By reference to Figure 5 it will be seen that provision is made for reenforcing the backing plate adjacent the shoe pivot. An arc-shaped angle plate 61 is secured by welding or otherwise to the backing plate 25. Adjacent the shoe anchor within the drum the plate 57 is shown in Figure 5 as secured to the backing plate, there being a space between the outermost portion of the backing plate and plate 57. Between plate 57 and the backing plate is the shoe pivot 55, a suitable anchor pin 63 being supported by both backing plate 25 and plate 57. A rigid anchor is therefore provided for the rotatably mounted shoe 51'. On the anchor pin 63 is a spacing ring 65. On this anchor pin are also shown washers 67. These parts, together with a nut 69, serve to complete the assembly of the shoe pivot.

To secure an even greater uniformity of drum engagement the band is in this form of the invention stiffened from a point adjacent the cam for such a distance as may be found desirable by welding or otherwise securing to the same side walls as at 71. These side walls may be further maintained in fixed position by one or more connecting pins 73. One of these pins is shown in Figure 3. The ends of these pins may be reduced and secured to the side wall 71. One of the pins adjacent the cam on each of the bands may be intermediately grooved as at 75 to receive the ends of a releasing spring designated on Figure 3 by numeral 63. The height of the walls 71 may be as desired and may be variable and extend as far as is needed to secure the most uniform action throughout the length of the band. In the form shown the maximum height is at a point near the cam from which point the height of the wall is reduced rapidly to the cam end, and from which point the height is reduced more gradually to a point adjacent the anchor 55 for the shoe 51'. No wall reenforcement is given the band in the region near the anchor as it is here that self-energization is high. It is only to give rigidity to the shoe in the region where the lining wear is relatively less that the reenforcement is provided and that region, as is well-known, is near the applied end of the band. In both forms of the invention the lining carried by the shoe for engagement with the band is preferably separable from the shoe and designated by numerals 77 and 77'.

In this second form of the invention the operation is the same as in the first. The same advantages result and the reenforced band is such as to produce an even more uniform distribution of pressure, with the result of making a powerful brake and one which acts uniformly throughout the greater part of the drum surface. The use of the intermediate shoe reduces pedal movement to a minimum, avoids the necessity of floating cam and centralizer and permits the lining to become worn out before renewed. Also the clearance may be greater than usual, thereby positively avoiding dragging brakes, and that too with no increase in pedal movement.

I claim:

1. Brake mechanism comprising a drum, a self-energizing band, a shoe movably engaging the band, manually operated means to move the shoe and through the instrumentality of the shoe to apply the band to the drum, the surface of said shoe and band having a coefficient of friction less than the engaging surfaces of the band and drum.

2. Brake mechanism comprising a drum, a self-energizing anchored band movable to engage said drum, anchor means between the ends of said band, a shoe slidingly engaging said band at a free end thereof, said engaging surface being substantially circumferential, brake actuating means engaging said shoe, the engaging surface of said shoe and actuating means being angularly related to said first mentioned surface whereby simultaneous outward movement of shoe and band may occur to cause the band and drum to engage and whereby circumferential movement of the band relative to the shoe may take place.

3. A brake, a drum, a band, a cam, a shoe between the band and cam having angular related surfaces, one substantially arc shaped and concentric with said drum and engaging the band, the other engaging the cam.

4. The invention defined by claim 3, said shoe being mounted for pivotal movement in applying the band to the drum.

5. The invention defined by claim 3, said band provided with a lining to engage the drum and said shoe having a lining to engage the band, the frictional coefficient of the band with the shoe lining being less than the frictional coefficient of the drum with the band lining.

6. A brake comprising a drum, a band having an intermediate anchor, a pivoted shoe having a curved surface slidably engaging one end of said band, and means manually operable to move said shoe and through the instrumentality of said shoe to move the end of said band into frictional contact with said drum.

7. The invention set forth in claim 6, said band anchor dividing the band into unequal parts, the said shoe being operable upon the longer part of said band.

8. A brake comprising a drum, a band having an intermediate anchor dividing the band into two portions, pivoted shoes having the ends remote from their pivots shaped circumferentially to slidably engage the ends of said band, and manually operable means between the said pivoted shoes to oppositely rotate said shoes about their pivots and expand said band ends into frictional engagement with the drum.

9. In a drum, an intermediately anchored band, at least one end of said band being reenforced to secure relative high drum pressure near this end, a pivoted shoe slidably engaging said end of said band, and manually operable means to effect contact of said band with said drum, said means operable through the shoe to effect contact of the before mentioned end of said band.

10. In a drum, an intermediately anchored band, at least one end of said band being reenforced to secure relative high drum pressure near this end, a pivoted shoe slidably engaging said end of said band, and manually operable means to effect contact of said band with said drum, said means operable through the shoe to effect contact of the before mentioned end of said band, the contacting surfaces of said shoe and band being substantially circumferential whereby after drum contact the band may slide along the shoe under the self-energizing influence of the drum without further movement of the manually operable means.

11. In a brake, a drum, a self-energizing band within said drum, means to modify the self-energizing influence comprising mechanism to actuate said band including a part slidable relative to said band and having a predetermined coefficient of friction with said band.

12. The invention defined by claim 11, said coefficient of friction being less than the coefficient of friction between the drum and the band.

13. The invention defined by claim 11, said part being pivotally mounted within said drum, having a metal to metal contact with said band and engaged and actuated by a manually operable member constituting a part of said means.

In testimony whereof I affix my signature.

GEORGE L. ROTHROCK.